T862001

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED MAY 6, 1969

862 O.G. 21

781,680

ORIENTED MALEIC ANHYDRIDE OLEFIN COPOLYMER FILM

Dennis Arthur Barr, Welwyn, and Richard Harold Barclay Buteux, Welwyn Garden City, England, assignors to Imperial Chemical Industries Limited, London, England, a corporation of Great Britain

Continuation of application Ser. No. 401,634, Oct. 5, 1964. This application Oct. 22, 1968. Published May 6, 1969

Claims priority, application Great Britain, Oct. 10, 1963, 40,056/63

Int. Cl. B29d *7/24;* C08f *17/00*

U.S. Cl. 264—289

No Drawing. 16 Pages Specification

A film of a copolymer of maleic anhydride and an olefin, which is a monoethylenically unsaturated hydrocarbon having 4 to 10 carbon atoms and selected from the group consisting of 1,1-dialkyl substituted ethylenes and aralkenes, which has been oriented by stretching. The stretching may be effected in one direction or in two mutually perpendicular directions in the plane of the film at a temperature generally between 150° C. and 200° C. and at draw ratios up to 8:1. Preferred uniaxially oriented films have tensile break strengths in the direction of orientation of 10,000 lbs./sq. in. and more and our preferred biaxially oriented films have tensile break strengths in any direction in the plane of the film of at least 10,000 lb./sq. in. The biaxially oriented film preferably shows little or no in-plane birefringence, indicating that the orientation in each direction in the plane is substantially the same. Such film will normally have a ratio of tensile break strengths in any two directions at right angles in the plane of the film of not more than 1.3:1.